United States Patent

Kobinata et al.

[11] Patent Number: 5,849,128
[45] Date of Patent: Dec. 15, 1998

[54] PACKAGING MATERIAL AND PROCESS FOR PRODUCING THE SAME

[75] Inventors: Motochika Kobinata, Shizuoka; Michio Nagashima; Morio Hara, both of Kanagawa, all of Japan

[73] Assignee: Tetra Laval Holdings & Finance S.A., Switzerland

[21] Appl. No.: 893,185

[22] Filed: Jul. 15, 1997

Related U.S. Application Data

[63] Continuation of Ser. No. 481,447, Jun. 20, 1995, abandoned.

[30] Foreign Application Priority Data

Dec. 28, 1992 [JP] Japan ..................... 4-349050

[51] Int. Cl.$^6$ ..................... B32B 27/10
[52] U.S. Cl. ............. 156/244.11; 156/90; 156/244.12; 156/244.17; 156/244.23; 156/272.6; 156/309.6; 156/380.9; 156/500; 156/501; 156/551
[58] Field of Search ..................... 156/90, 244.11, 156/244.12, 244.17, 244.23, 272.6, 309.6, 380.9, 500, 501, 551

[56] References Cited

U.S. PATENT DOCUMENTS

| | | | |
|---|---|---|---|
| 4,115,181 | 9/1978 | Fuji et al. | 156/500 |
| 4,300,969 | 11/1981 | Frydendal | 156/244.11 |
| 4,950,510 | 8/1990 | Massouda | 428/34.2 |
| 5,057,359 | 10/1991 | Merdem et al. | 428/513 |

FOREIGN PATENT DOCUMENTS

| | | |
|---|---|---|
| A0138612 | 4/1985 | European Pat. Off. |
| A0293252 | 11/1988 | European Pat. Off. |
| A2704689 | 11/1977 | Germany |
| A1080649 | 8/1967 | United Kingdom |
| A9115410 | 10/1991 | WIPO |
| A9201558 | 2/1992 | WIPO |

OTHER PUBLICATIONS

Database WPI, Section Ch, Week 8827.

*Primary Examiner*—Charles Nold
*Attorney, Agent, or Firm*—Lorusso & Loud

[57] ABSTRACT

A packaging material (41) and a process and apparatus for producing the same are disclosed herein, wherein an satisfactorily enhanced gas barrier property is intended to be provided using a grease-proof paper sheet (23). A first layer (16) is formed on an outer surface which will be directed outwardly, when a package or container will be formed from the packaging material, and a second layer (37) is formed on an inner surface which will be directed outwardly, when the package or container will be formed from the packaging material. A substrate and a grease-proof paper layer (23) are provided between the first layer (16) and the second layer (37). At least one of the first and-second layers (16) and (37) is formed from a polymer selected from the group consisting of polyolefins. The grease-proof paper layer (23) has a TAPPI value in a range of 100 to 400 seconds. A polymer is coated on at least one of surfaces of the grease-proof paper layer (23). Thus, it is possible to provide a satisfactorily enhanced gas barrier property. The surface of the grease-proof paper layer (23) can be also activated by a surface-activating treatment.

8 Claims, 5 Drawing Sheets

PACKAGING MATERIAL AND PROCESS FOR PRODUCING THE SAME

This application is a continuation, of application Ser. No. 08/481,447, filed Jun. 20, 1995, now abandoned.

TECHNICAL FIELD

The present invention relates a packaging material, and a process and an apparatus for producing the same.

BACKGROUND ART

A package or container has conventionally been used to accommodate foods such as refreshing drinks, jams and other convenience foods. The packaging container may be formed by processing a packaging material into a brick-like configuration. The packaging material comprises a paperboard or paper substrate, an aluminum foil layer formed on an inner surface of the substrate with a polymer layer interposed therebetween and formed from, for example, an adhesive polymer. Thus, the aluminum foil layer provides an improved gas barrier property against a content within the package or container.

Further, a polyethylene layer is formed on an inner surface of the aluminum foil layer with an adhesive polymer interposed therebetween, and a polyethylene layer is also formed on an outer surface of the substrate. It should be noted that the two adhesive polymer layers are provided in order to improve the adhesion between the substrate and the aluminum foil layer and between the aluminum foil layer and the polyethylene layer.

Such a packaging material has conventionally been provided, which is made using a grease-proof paper layer (GPP) having an oil resistance and a large TAPPI value more than 900 seconds, with a polymer layer made of a polyolefin such as polypropylene (PP) being formed between the grease-proof paper layer and a cardboard substrate (see Japanese Patent Application Laid-open No.139339/89).

In such a case, the gas barrier property of the packaging material made using each of the grease-proof paper layer and the polymer layer alone is not particularly high, but the gas barrier property can be enhanced by forming a combination of the grease-proof paper layer and the polymer layer in a laminated structure.

In the above prior art packaging material, however, the grease-proof paper layer having a large TAPPI value and the adhesive polymer layer are laminated in a face-to-face manner and hence, the adhesive polymer cannot be satisfactorily incorporated into the grease-proof paper layer. Consequently, it is impossible to provide an enhanced gas barrier property.

Accordingly, it is an object of the present invention to provide a packaging material and a process and apparatus for producing the same, wherein the problem associated with the prior art packaging material can be overcome to enhance the gas barrier property by using a grease-proof paper sheet.

DISCLOSURE OF THE INVENTION

To achieve the above object, according to a first aspect and feature of the present invention, there is provided a packaging material having a laminate structure comprising a first layer formed on an outer surface which will be directed outwardly upon formation of a packaging container from the packaging material, a second layer formed on an inner surface which will be directed inwardly upon formation of the packaging container from the packaging material, and at least a substrate and a grease-proof paper layer formed between the first and second layers, wherein at least one of the first and second layers is formed from a polymer selected from the group consisting of polyolefins, and the grease-proof paper layer has a TAPPI value in a range of 100 to 400 seconds and includes a polymer layer formed on at least one surfaces thereof by coating of a polymer.

Thus, the packaging material has an enhanced gas barrier property.

The surface of the grease-proof paper layer coated with the polymer may be activated by a surface-activating treatment. Therefore, the adhesion between the grease-proof paper layer and the polymer layer is enhanced, so that the polymer of the polymer layer can be sufficiently incorporated into the grease-proof paper layer to satisfactorily enhance the gas barrier property of the packaging material.

In this case, the surface-activating treatment may be performed by discharging corona onto the surface of the grease-proof paper layer, or baking the surface of the grease-proof paper layer. The polymer which may be used is one selected from the group consisting of polyolefins.

The second layer may be formed from a barrier polymer, or a barrier layer formed from a polymer having a barrier property may be provided between the first and second layers. In this case, the gas barrier property of the packaging material can be further enhanced.

In addition, according to a second aspect and feature of the present invention, there is provided a packaging material having a laminate structure comprising a first layer formed on an outer surface which will be directed outwardly upon formation of a packaging container from the packaging material, a second layer formed on an inner surface which will be directed inwardly upon formation of the packaging container from the packaging material, and at least a substrate and a grease-proof paper layer formed between the first and second layers, wherein at least one of the first and second layers is formed from a polymer selected from the group consisting of polyolefins, and the grease-proof paper layer has a TAPPI value in a range of 100 to 400 seconds, and includes a surface-activating coating agent of a polymer applied to at least one of surface thereof.

The surface-activating coating agent has a good adhesive property, and if such surface-activating coating agent is applied to the grease-proof paper layer, it is sufficiently incorporated into the grease-proof paper layer, thereby providing an enhanced gas barrier property. Therefore, a surface-activating treatment which may be otherwise applied to the grease-proof paper layer is not required.

In this case, a polymer used for the surface-activating coating agent may be one selected from the group consisting of a polyvinyl alcohol, an ethylene/vinyl alcohol copolymer and a polymer having an equivalent surface-activating property.

Further, according to a third aspect and feature of the present invention, there is provided a process for producing a packaging material having a laminate structure comprising a first layer formed on an outer surface which will be directed outwardly upon formation of a packaging container from the packaging material, a second layer formed on an inner surface which will be directed inwardly upon formation of the packaging container from the packaging material, and at least a substrate and a grease-proof paper layer formed between the first and second layers, the process comprising the steps of delivering a substrate and a grease-proof paper sheet, subjecting one of surfaces of the grease-proof paper sheet to a surface-activating treatment to activate the surface, coating a polymer onto the activated surface of the grease-proof paper sheet to form a polymer layer, and laminating the grease-proof paper sheet with the polymer layer formed thereon and the substrate onto each other.

Thus, the polymer layer is formed continuously. The grease-proof paper sheet and the polymer layer are laminated with the substrate to form the packaging material, leading to an improved productivity.

In this process, the surface-activating treatment is performed by discharging corona onto the surface of the grease-proof paper sheet, or baking such surface. The polymer which may be used is one of polyolefins.

Further, a barrier polymer may be coated on to the surface of the polymer layer to form a barrier layer.

In addition, according to a fourth aspect and feature of the present invention, there is provided a process for producing a packaging material having a laminate structure comprising a first layer formed on an outer surface which will be directed outwardly upon formation of a packaging container from the packaging material, a second layer formed on an inner surface which will be directed inwardly upon formation of the packaging container from the packaging material, and at least a substrate and a grease-proof paper layer formed between the first and second layers, the process comprising the steps of delivering a substrate and a grease-proof paper sheet, coating a surface-activating coating agent of a polymer onto at least one of surfaces of the grease-proof paper sheet, and laminating the grease-proof paper sheet coated with the surface-activating coating agent and the substrate onto each other.

The surface-activating coating agent which may be used is a polymer selected from the group consisting of a polyvinyl alcohol, an ethylene/vinyl alcohol copolymer, a polyvinylidene chloride and a polymer having an equivalent surface-activating property.

Further, according to a fifth aspect and feature of the present invention, there is provided an apparatus for producing a packaging material having a laminate structure comprising a first layer formed on an outer surface which will be directed outwardly upon formation of a packaging container from the packaging material, a second layer formed on an inner surface which will be directed inwardly upon formation of the packaging container from the packaging material, and at least a substrate and a grease-proof paper layer formed between the first and second layers, the apparatus comprising a feeder for delivering a substrate, a feeder for delivering a grease-proof paper sheet, a surface-activating device for subjecting at least one of surfaces of the grease-proof paper sheet to a surface-activating treatment to activate the surface, an extruding die device for coating a polymer onto the activated surface of the grease-proof paper sheet to form a polymer layer, and a roller for laminating the grease-proof paper sheet with the polymer layer formed thereon and the substrate onto each other.

Yet further, according to a sixth aspect and feature of the present invention, there is provided an apparatus for producing a packaging material having a laminate structure comprising a first layer formed on an outer surface which will be directed outwardly upon formation of a packaging container from the packaging material, a second layer formed on an inner surface which will be directed inwardly upon formation of the packaging container from the packaging material, and at least a substrate and a grease-proof paper layer formed between the first and second layers, the apparatus comprising a feeder for delivering a substrate, a feeder for delivering a grease-proof paper sheet, a coating device for coating a surface-activating coating agent onto at least one of surfaces of the grease-proof paper sheet, and a roller for laminating the grease-proof paper sheet coated with the surface-activating coating agent and the substrate onto each other.

BEST MODE FOR CARRYING OUT THE INVENTION

The best mode for carrying out the present invention will now be described in detail in connection with the accompanying drawings.

Figure 1:
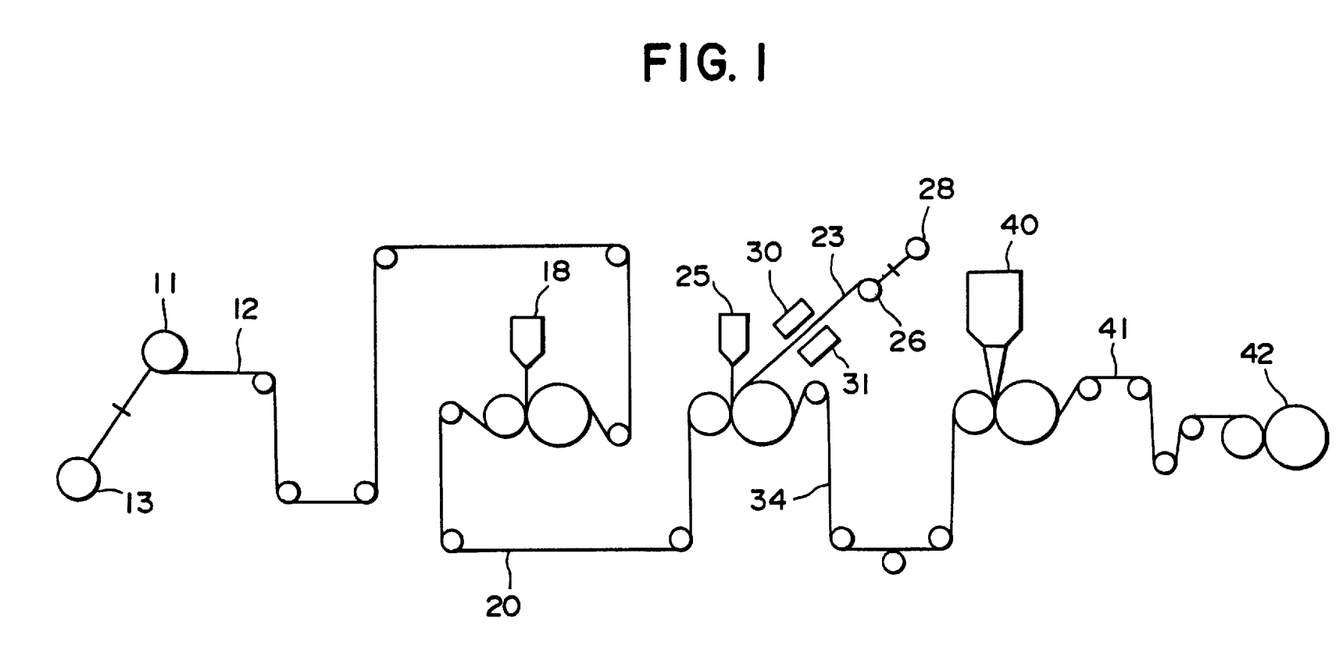
FIG. 1 is a diagram illustrating a process for producing a packaging material according to a first embodiment of the present invention.
Figure 2:
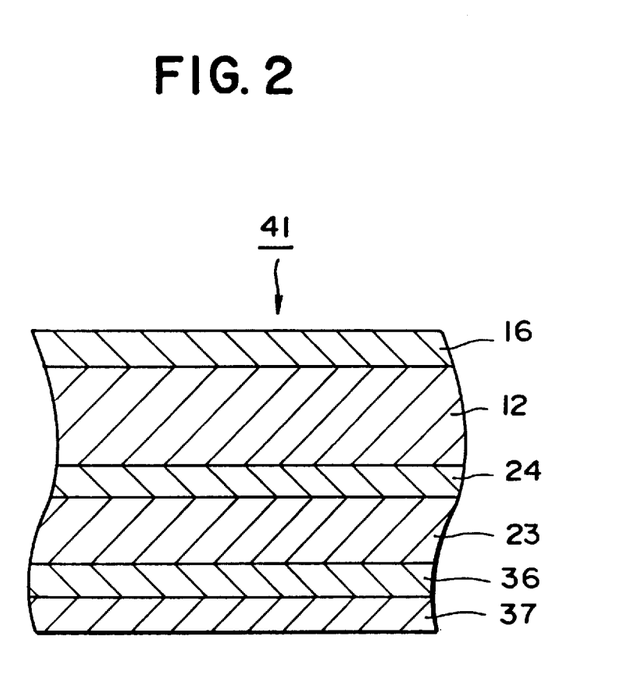
FIG. 2 is a sectional view of a packaging material produced by the producing process according to the first embodiment of the present invention.

FIG. 1 is a diagram illustrating a process for producing a packaging material according to a first embodiment of the present invention, and FIG. 2 is a sectional view of a packaging material produced by the producing process according to the first embodiment of the present invention.

In these Figures, a roll of paperboard 12 used for a substrate is designated by reference numeral 11 and is delivered by a feeder 13 and transported. A low density polyethylene (LDPE) is coated onto one of surfaces of the paperboard 12, i.e., a surface (which will be referred to as an outer surface hereinafter) which will be directed outwardly, when a packaging material is, folded to form a packaging container, thereby forming a first layer 16. For this purpose, a first extruding die device 18 is disposed in an opposed relation to the outer surface of the paperboard 12. The material for forming the first layer 16 is not limited to the low density polyethylene, but another polyethylene (E) may be coated.

The paperboard 12 with the first layer 16 formed thereon is a transported in the form of a laminate 20. Then, a grease-proof paper sheet 23 is laminated to the other surface of the paperboard 12, i.e., a surface (which will be referred to as an inner surface) which will be directed inwardly, when a packaging material is folded to form a packaging container, by a pair of rollers, with a polymer layer 24 interposed therebetween. In this case, the grease-proof paper sheet 23 is laminated, so that the polymer layer 24 faces the inner surface of the paperboard 12 of the laminate 20.

For this purpose, a second extruding die device 25 and a roll 26 of grease-proof paper sheet are disposed in an opposed relation to the inner surface of the paperboard 12 downstream of the first extruding die device 18. A polymer or an adhesive polymer extruded from the second extruding die device 25 forms a polymer layer 24 on the inner surface of the paperboard 12, and a grease-proof paper sheet 23 delivered by the feeder 28 is laminated onto the laminate 20 with the polymer layer 24 interposed therebetween.

In this case, the polymer which may be used is one of polyolefins such as a polyethylene, a polypropylene, a low density polyethylene, a linear low density polyethylene (L-LDPE), and the adhesive polymers which may be used is an ethylene/acrylic acid copolymer (EAA) or the like.

The grease-proof paper sheet 23 which may be used is a paper sheet having a high oil-resistance and a TAPPI value in a range of 100–400 seconds. It is known that the gas barrier property is not particularly high, when the grease-proof paper sheet is used alone, but the gas barrier property is increased by forming the grease-proof paper layer in a laminated structure with the polymer layer. If the grease-proof paper sheet 23 as it is, is only brought into contact with the polymer, the adhesion is poor, so that the polymer cannot be sufficiently incorporated into the grease-proof paper sheet. Therefore, the gas barrier property cannot be sufficiently increased.

Thereupon, the outer surface of the grease-proof paper sheet 23, before being brought into contact with the polymer extruded from the second extruding die device 25, is subjected to a surface-activating treatment. For this purpose, a surface-activating device 30 is disposed in such a manner that it is opposed to the outer surface of the grease-proof paper sheet 23 delivered by the feeder 28.

The surface-activating device 30 may be comprised of either a corona treating device (not shown) for providing a corona discharge or a thermally treating device (not shown) using a gas burner, or both of them. Thus, the outer surface of the grease-proof paper sheet 23 may be subjected to the corona discharge provided by the corona treating device and/or may be baked by the thermally treating device.

This ensures that a carbonyl group can be formed on the outer surface of the grease-proof paper sheet 23, thereby providing a polarity to provide a wet index of about 42 to 50 dynes, so that the outer surface is activated. Consequently, the grease-proof paper sheet 23 and the polymer layer 24 are bonded satisfactorily, and the polymer is incorporated satisfactorily into the grease-proof paper sheet 23, thereby providing an enhanced gas barrier property.

The inner surface of the grease-proof paper sheet 23 is also subjected to the surface-activating treatment. For this purpose, a surface-activating device 31 is disposed in such a manner that it is opposed to the inner surface of the grease-proof paper sheet 23 delivered by the feeder 28.

As is the surface-activating device 30, the surface-activating device 31 may be also comprised of either a corona treating device (not shown) for providing a corona discharge or a thermally treating device (not shown) using a gas burner, or both of them. Thus, the inner surface of the grease-proof paper sheet 23 may be subjected to the corona discharge provided by the corona treating device and/or may be baked by the thermally treating device. It should be noted that the surface-activating device 31 is disposed in an opposed relation to the surface-activating device 30 in this embodiment, but alternatively, the surface-activating device 31 may be disposed at a location in which it will be opposed to the inner surface of a laminate 34 comprising the paperboard 12, the first layer 16, the polymer layer 24 and the grease-proof paper layer 23, downstream of the second extruding die device 25.

This ensures that a carbonyl group can be formed on the inner surface of the grease-proof paper sheet 23, thereby providing a polarity to provide a wet index of about 42 to 50 dines, so that the outer surface is activated.

Then, a first polymer is coated onto that inner surface of laminate 34 which has been subjected to the surface-activating treatment, thereby forming a polymer layer 36. For this purpose, a third extruding die device 40 is disposed in an opposed relation to the inner surface of the grease-proof paper layer 23 of the laminate 34 downstream of the second extruding die device 25. Examples of the first polymer for forming the polymer layer, which may be used, are polyolefins such as a polyethylene, a polypropylene, a low density polyethylene, a linear low density polyethylene and the like.

The activated inner surface of the grease-proof paper layer 23 and the polymer layer 36 are bonded satisfactorily, and the polymer is incorporated satisfactorily into the grease-proof paper layer 23, thereby providing an enhanced gas barrier property.

It should be noted that in place of the grease-proof paper sheet, a kraft paper sheet may be used.

The polymer layer 36 is formed by subjecting the inner surface of the grease-proof paper layer 23 to the surface-activating treatment by the surface-activating device 31 and coating the polymer thereonto. In this case, in order to enhance the adhesion between the polymer layer 36 and the grease-proof paper layer 23, the polymer is supplied at a high temperature from the third extruding die device 40 onto the inner surface of the grease-proof paper layer 23 and as a result, the polymer of the high temperature may give out an odor.

Accordingly, a second polymer for deodorization is further coated onto the inner surface of the polymer layer 36 to form a second layer 37.

In this case, the third extruding die device 40 has two slits for extruding the second polymer in addition to the first polymer. A difference in temperature is provided within the third extruding die device 40 for the first and second polymers, so that the first polymer is placed at a location of a higher temperature, and the second polymer is placed at a location of a lower temperature. By placing the second polymer at the location of the lower temperature in this manner, the second layer 37 can be formed by a low temperature extrusion to lie at an innermost location on a packaging material 41, so that the odor given out by the polymer layer 36 can be prevented from being transferred to a content accommodated in the packaging container.

Examples of the second polymer for forming the second layer 37, which may be used, are a low density polyethylene, a linear low density polyethylene, a high density polyethylene (HDPE) and the like.

In this manner, the polymer layer 36 and the second layer 37 are formed on the laminate 34 by the third extruding die device 40, thereby completing the packaging material 41. The packaging material 41 is wound around a winding roll 42 by a winder which is not shown.

The laminated structure of the packaging material 41 in the first embodiment of the present invention will be described below.

A material is shown herein which has a first layer 16, a paperboard 12, a polymer layer 24, a grease-proof paper layer 23, a polymer layer 36 and a second layer 37 in sequence from a left end to a right end.

LDPE/Paper/LDPE/GPP/LDPE/LDPE

LDPE/Paper/LDPE/GPP/L-LDPE/LDPE

LDPE/Paper/Adh.Polymer/GPP/L-LDPE/L-LDPE

LDPE/Paper/Adh.Polymer/GPP/LDPE/HDPE

LDPE/Paper/Adh.Polymer/GPP/L-LDPE/HDPE

It should be noted that in order to further enhance the gas barrier property of the packaging material 41 having the above described configuration, a barrier polymer having a high gas barrier property may be used for the second layer 37.

In this case, the first polymer is coated to form the polymer layer 36 on that inner surface of the grease-proof paper layer 23 of the laminate 34 which has been subjected to the surface-activating treatment, and the second polymer is further coated to form the second layer 37 on the inner surface of the first polymer layer 36. In this case, the second layer 37 constitutes a barrier layer, and a barrier polymer having a high gas barrier property is used as the second polymer. For this purpose, the third extruding die device 40 is disposed in an opposed relation to the inner surface of the grease-proof paper layer 23 of the laminate 34 downstream of the second extruding die device 25.

The third extruding die device 40 has the two slits for extruding the first polymer and the barrier polymer. The polymer layer 36 and the second layer 37 are formed on the laminate 34 by the third extruding die device 40, thereby completing the packaging material 41. The packaging material 41 is wound around the winding roll 42 by the winder which is not shown.

Even in this case, a difference in temperature is provided for the first polymer and the barrier polymer within the third extruding die device 40, so that the first polymer is placed at a location of a higher temperature, and the barrier polymer is placed at a location of a lower temperature. By placing the barrier polymer at the location of the lower temperature in this manner, the second layer 37 can be formed to lie at an innermost location of the packaging material 41 by a low temperature extrusion and hence, an odor given out by the first polymer layer 36 can be prevented from being transferred to a content within a resulting package or container.

Examples of the first polymer for forming the polymer layer 36, which may be used, are polyolefins such as a polyethylene, a polypropylene, a low density polyethylene, a linear low density polyethylene and the like.

Examples of the barrier polymer for forming the second layer 37, which maybe used, are a polyester (PET), an amorphous polyester (APET), an ethylene/vinyl alcohol copolymer (EVOH), a polyvinylidene chloride (PVDC) and the like.

A second embodiment of the present invention will now be described.

Figure 3:
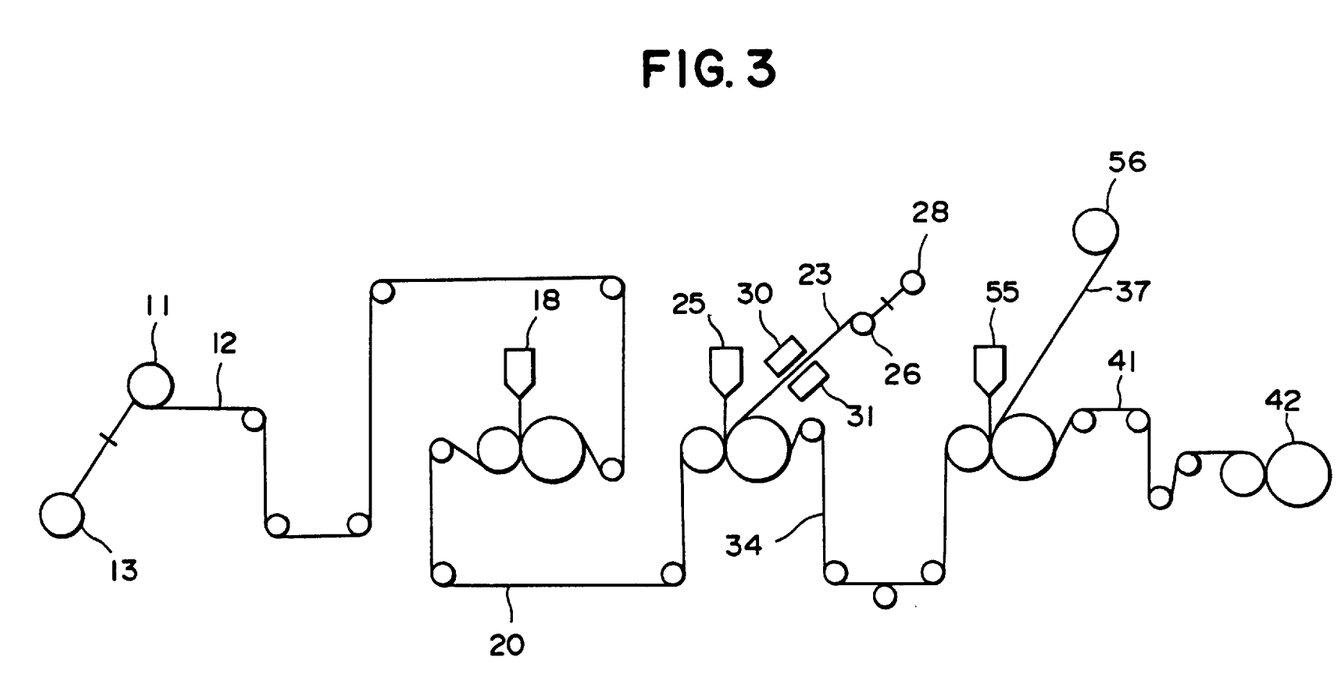
FIG. 3 is a diagram illustrating a process for producing a packaging material according to a second embodiment of the present invention.

In the second embodiment, an adhesive polymer is coated on an inner surface of a grease-proof paper layer 23 of a laminate 34 of the type described above to form a polymer layer 36, and a polymer or a barrier polymer is coated onto the polymer layer 36 in the form of a film having a low temperature to form a second layer 37, thereby preventing an odor from being given out from the polymer layer 36.

FIG. 3 is a diagram for illustrating a process for producing a packaging material according to the second embodiment of the present invention.

Referring to FIG. 3, a roll of paperboard 12 serving as a substrate is designated by 11, and the paperboard 12 is delivered from the roll 11 by the feeder 13 and transported. A polymer such as a low density polyethylene or an adhesive polymer such as an ethylene/acrylic acid copolymer is applied to the outer surface of the paperboard 12 to form a first layer 16. For this purpose, the first extruding die device 18 is disposed in an opposed relation to the outer surface of the paperboard 12.

The paperboard 12 with the first layer 16 formed thereon is transported in the form of a laminate 20, and a polymer layer 24 is laminated in a face-to-face manner onto the inner surface of the paperboard 12 of the laminate 20.

For this purpose, a second extruding die device 25 and a roll of grease-proof paper 26 are disposed in an opposed relation to the inner surface of the paperboard 12 downstream of the first extruding die device 18. Thus, an adhesive polymer such as an ethylene/Acrylic acid copolymer extruded from the second extruding die device 25 or a polymer such as a low density polyethylene and a linear low density polyethylene is applied to the inner surface of the paperboard 12 to form a polymer layer 24, and a grease-proof paper sheet 23 delivered by the feeder is laminated onto the laminate 20 with the polymer layer 24 interposed therebetween.

A paper sheet having a high oil resistance and a TAPPI value in a range of 100 to 400 seconds is used for the grease-proof paper sheet. The outer surface of the grease-proof paper sheet 23, before being brought into contact with the polymer extruded from the second extruding device 25, is subjected to the surface-activating treatment. For this purpose, a surface-activating device 30 is disposed in an opposed relation to the outer surface of the grease-proof paper sheet 23 by the feeder 28.

The surface-activating device 30 may be comprised of either a corona treating device (not shown) for providing a corona discharge or a thermally treating device (not shown) using a gas burner, or both of them. Thus, the outer surface of the grease-proof paper sheet 23 is subjected to the corona discharge provided by the corona treating device, and/or may be baked by the thermally treating device.

This ensures that a carbonyl group can be formed on the outer surface of the grease-proof paper sheet 23, thereby providing a polarity to provide a wet index of about 42 to 50 dynes, so that the outer surface is activated. Consequently, the grease-proof paper sheet 23 and the polymer layer 24 are bonded satisfactorily, and the adhesive polymer or the polymer is incorporated satisfactorily into the grease-proof paper sheet, 23, thereby providing an enhanced gas barrier property.

The inner surface of the grease-proof paper sheet 23 is also subjected to the surface-activating treatment. For this purpose, a surface-activating device 31 is disposed in such a manner that it is opposed to the inner surface of the grease-proof paper sheet 23 delivered by the feeder 28.

As is the surface-activating device 30, the surface-activating device 31 may be also comprised of either a corona treating device (not shown) for providing a corona discharge or a thermally treating device (not shown) using a gas burner, or both of them. Thus, the inner surface of the grease-proof paper sheet 23 may be subjected to the corona discharge provided by the corona treating device and/or may be baked by the thermally treating device. It should be noted that the surface-activating device 31 is disposed in an opposed relation to the surface-activating device 30 in this embodiment, but alternatively, the surface-activating device 31 may be disposed at a location in which it will be opposed to the inner surface of a laminate 34 comprising the paperboard 12, the first layer 16, the polymer layer 24 and the grease-proof paper layer 23, downstream of the second extruding die device 25.

This ensures that a carbonyl group can be formed on the outer surface of the grease-proof paper sheet 23, thereby providing a polarity to provide a wet index of about 42 to 50 dynes, so that the outer surface is activated.

Then, an adhesive polymer is applied to that inner surface of the laminate 34 which has been subjected to the surface-activating treatment, thereby forming a polymer layer 36, and a polymer or a barrier polymer is further applied to the inner surface of the polymer layer 36 to form a second layer 37. In this case, only one or both of the polymer and the barrier polymer may be applied to the inner surface of the polymer layer 36 to form the second layer 37.

For this purpose, a third extruding die device 55 and a film roll 56 are disposed in an opposed relation to the inner surface of the grease-proof paper layer of the laminate 34 downstream of the second extruding die device 25. Thus, an adhesive polymer is extruded from the third extruding die device 55, and a film like material for forming the second layer 37 is delivered from a feeder which is not shown.

Such a construction ensures that the grease-proof paper sheet 23 with its inner surface activated and the polymer layer 36 are bonded satisfactorily, and the adhesive polymer or the polymer is incorporated satisfactorily into the grease-proof paper sheet 23, thereby providing an improved gas barrier property.

In this manner, the polymer layer 36 and the second layer 37 are formed on the laminate 34, thereby completing a packaging material. This packaging material is wound around a winding roll 42 by a winder which is not shown.

In this case, because the adhesive polymer is used for the polymer layer 36, the adhesion between the grease-proof paper sheet 23 and the second layer 37 is good, and a polymer or a barrier polymer for the second layer 37, after being extruded from an extruding die device (which is not shown) and cooled sufficiently, can be supplied in the form of a film having a low temperature onto the inner surface of the grease-proof paper sheet 23. Therefore, it is possible to prevent the adhesive polymer from giving out an odor.

An ethylene/acrylic acid copolymer may be used as the adhesive polymer for forming the polymer layer 36. A polymer such as a low density polyethylene, a linear low density polyethylene and the like may be used as the polymer for forming the second layer 37, and a polymer such as a polyester, an amorphous polyester, an ethylene/vinyl alcohol copolymer, a polyvinylidene chloride and the like may be used as the barrier polymer for forming the second layer 37.

The laminated structure of the packaging material 41 according to the second embodiment of the present invention will be described below.

Even in this case, a material is shown which has a first layer 16, a paperboard 12, a polymer layer 24, a grease-proof paper layer 23, a polymer layer 36 and a second layer 37 from a left end to a right end.

LDPE/Paper/LDPE/GPP/Adh.Polymer/LDPE
LDPE/Paper/LDPE/GPP/EAA/LDPE
LDPE/Paper/Adh.Polymer/GPP/Adh.Polymer/L-LDPE
LDPE/Paper/Adh.Polymer/GPP/Adh.Polymer/Barrier Polymer
LDPE/Paper/Adh.Polymer/GPP/Adh.Polymer/APET
LDPE/Paper/Adh.Polymer/GPP/Adh.Polymer/APA
LDPE/Paper/Adh.Polymer/GPP/Adh.Polymer/APET
LDPE/Paper/Adh.Polymer/GPP/Adh.Polymer/PVDC
LDPE/Paper/L-LDPE/GPP/Adh.Polymer/L-LDPE
Adh.Polymer/Paper/L-LDPE/GPP/Adh.Polymer/L-LDPE A third embodiment of the, present invention will now be described.

Figure 4:
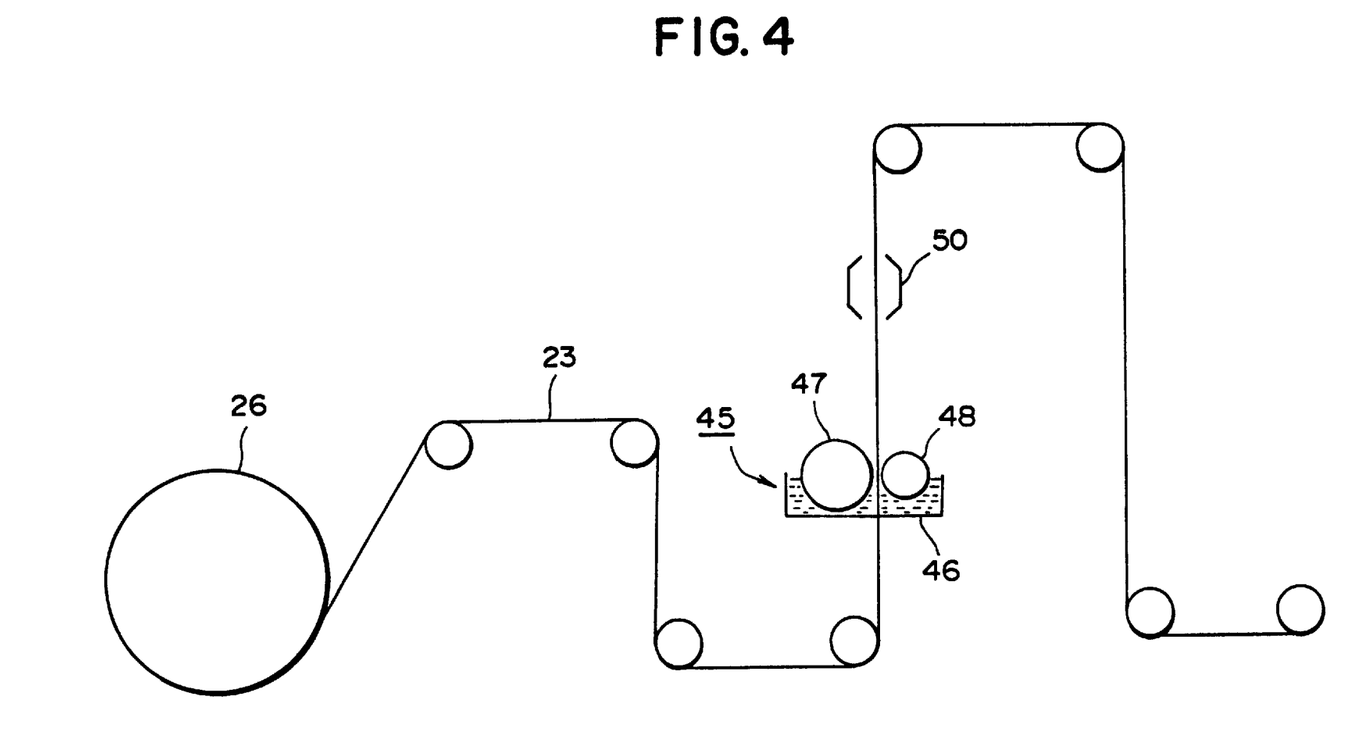
FIG. 4 is a diagram illustrating a process for producing a packaging material according to a third embodiment of the present invention.
Figure 5:
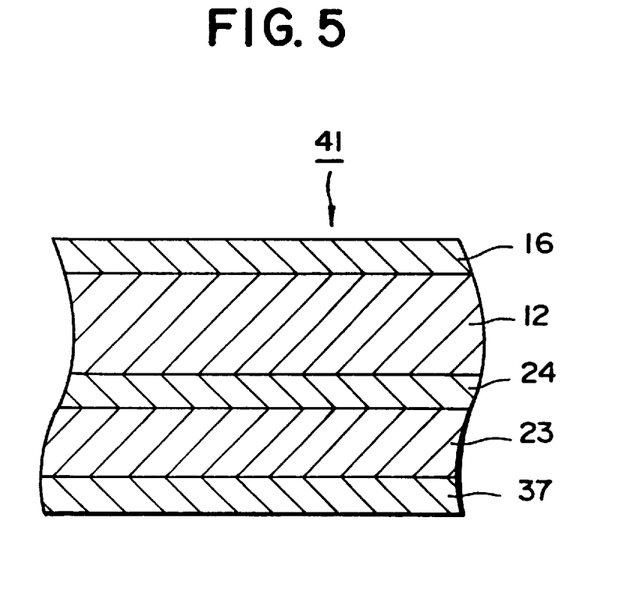
FIG. 5 is a sectional view of a packaging material produced by the producing process according to the third embodiment of the present invention.

In this embodiment, the adhesion between a polymer layer 24 and a second layer 37 can be enhanced by coating one or both of surfaces of a grease-proof paper sheet 23. Not only a polymer but also a grease-proof paper sheet can be used to form the second layer 37. When a polymer is used for the second layer 37, the polymer can be supplied in the form of a film having a low temperature onto an inner surface of the grease-proof paper sheet 23.

FIG. 4 is a diagram illustrating a process for producing a packaging material according to the third embodiment of the present invention, and FIG. 5 is a sectional view of the packaging material produced by the producing process according to the third embodiment of the present invention.

In these Figures, reference numeral 41 is a packaging material; reference numeral 12 is a paperboard; reference numeral 16 is a first layer; reference numeral 23 is a grease-proof paper sheet; reference numeral 24 is a polymer layer; reference numeral 26 is a roll of grease-proof paper sheet delivered by a feeder 28 (see FIG. 1); reference numeral 37 is a second layer; reference numeral 45 is a surface-activating/coating device; and reference numeral 50 is a drier.

The grease-proof paper sheet 23 is transported to the surface-activating/coating device 45, where a polyvinyl alcohol (PVA) as a surface-activating/coating agent is coated onto opposite surfaces of the grease-proof paper sheet 23. For this purpose, the surface-activating/coating device 45 includes a coating tank 46 with a polyvinyl alcohol solution accommodated therein, and rollers 47 and 48 for coating the polyvinyl alcohol onto the surface of the grease-proof paper sheet 23.

The polyvinyl alcohol exhibits a good adhesion because of its high hydrophilic nature. If the polyvinyl alcohol is applied to the opposite surfaces of the grease-proof paper sheet 23, it is satisfactorily incorporated into the grease-proof paper sheet 34, which makes it possible to provide ah enhanced gas barrier property. Therefore, a corona treating device for providing a corona discharge to the grease-proof paper sheet 23 and a thermally treating device using a gas burner are not required.

In this case, because the adhesion between the grease-proof paper sheet 23 and the second layer 37 is good, any of a grease-proof paper sheet and a polymer such as a low density polyethylene can be used for the second layer 37 When such a polymer is used for the second layer 37, the polymer, after being extruded from an extruding die device and cooled sufficiently, can be supplied in the form of a film having a low temperature onto an inner surface of the grease-proof paper sheet 23. Thus, it is possible to prevent an odor from being given out from a resulting packaging material 41.

It should be noted that in addition to the polyvinyl alcohol, any of an ethylene/vinyl alcohol copolymer, a polyvinylidene chloride or the like can be used as the surface-activating/coating agent coated onto the opposite surfaces of the grease-proof paper sheet 23. It should be also appreciated that although the surface-activating/coating agent is coated onto the opposite surfaces of the grease-proof paper sheet 23 in this embodiment, the surface-activating/coating agent may be coated onto only one of the surfaces of the grease-proof paper sheet 23.

The laminated structure of the packaging material according to the third embodiment of the present invention will be described below.

A material is shown herein which has a first layer 16, a paperboard 12, a polymer layer 24, a grease-proof paper layer 23, and a surface-activating agent/a second layer 37 in sequence from a left end to a right end.

LDPE/Paper/LDPE/GPP:PVA/LDPE
LDPE/Paper/LDPE/GPP PVDC/LDPE
LDPE/Paper/LDPE/GPP:EVOH/LDPE LDPE/Paper/LDPE/PVA:GPP:PVA/GPP LDPE/Paper/LDPE/PVA:GPP:PVA/LDPE Although the embodiments of the present invention have been described in detail, it will be understood that the present invention is not limited to these embodiments, and various modifications can be made without departing from the spirit and scope of the invention defined in claims.

INDUSTRIAL APPLICABILITY

As discussed above, the packaging material and the process and apparatus for producing the same according to the present invention are useful in producing a package or container having a gas barrier property from the packaging material.

What is claimed is:

1. A process for producing a packaging material having a laminate structure comprising a first polymer layer providing an outer surface which will be directed outwardly upon formation of a packaging container from the packaging material, a second polymer layer providing an inner surface which will be directed inwardly upon formation of the packaging container from the packaging material, and at least a substrate and a grease-proof paper layer formed between the first and second polymer layers, said process comprising:

(a) providing a substrate and a grease-proof paper sheet, (b) subjecting the surfaces of said grease-proof paper sheet to a surface-activating treatment to activate the surfaces, (c) melt-extruding a third polymer and a fourth polymer as melts onto respective activated surfaces of said grease-proof paper sheet to form a third polymer layer and a fourth polymer layer, respectively, and to incorporate said third and fourth polymers into said grease-proof paper sheet, said fourth polymer emitting an odor and being melt-extruded at a first temperature, (d) laminating said grease-proof paper sheet to said substrate through said third polymer melt, and (e) forming and applying said second polymer layer, at a second temperature lower than said first temperature, over said fourth polymer layer to form a barrier to said odor.

2. A process according to claim 1, wherein said surface-activating treatment is performed by discharging corona onto the surfaces of said grease-proof paper sheet.

3. A process according to claim 1, wherein said surface-activating treatment is performed by baking the surface of said grease-proof paper sheet.

4. A process according to claim 1, wherein said first polymer is selected from the group consisting of polyolefins.

5. A process according to claim 1, wherein a barrier polymer is coated onto the surface of said first polymer layer to form a barrier layer.

6. A process according to claim 1 wherein said second and fourth polymer layers are formed by extrusion through separate slits formed in the same extrusion head.

7. A process according to claim 1 wherein said second polymer layer is formed by extrusion of a second polymer and further comprising cooling the extruded second polymer and bringing the cooled extruded polymer into contact with said fourth polymer layer to form said laminate.

8. A process for producing a packaging material having a laminate structure comprising a first polymer layer providing an outer surface which will be directed outwardly upon formation of a packaging container from the packaging material, a second polymer layer providing an inner surface which will be directed inwardly upon formation of the packaging container from the packaging material, and at least a substrate and a grease-proof paper layer formed between said first and second polymer layers, said process comprising:

(a) providing a substrate and a grease-proof paper sheet;

(b) coating a surface-activating agent onto the surfaces of said grease-proof paper sheet, said surface-activating agent being a polymer selected from the group consisting of polyvinyl alcohol, ethylene/vinyl alcohol copolymers and polyvinylidene chloride;

(c) laminating said grease-proof paper sheet coated with said surface-activating coating agent to said substrate, (d) coating said substrate to form said first polymer layer, and (e) forming said second polymer layer over the coated surface of said grease-proof paper sheet opposite said substrate as a barrier to odor.

* * * * *

UNITED STATES PATENT AND TRADEMARK OFFICE
CERTIFICATE OF CORRECTION

PATENT NO. : 5,849,128
DATED : December 15, 1998
INVENTOR(S) : KOBINATA et al

It is certified that error appears in the above-indentified patent and that said Letters Patent is hereby corrected as shown below:

Col. 1, line 18, after "substrate" insert --and--.

Col. 2, line 8, "surfaces" should read --surface--.

Col. 3, line 15, "on to" should read --onto--.
Col. 4, line 45, "is," should read --is--.

Col. 8, line 7, "Acrylic" should read --acrylic--; and
line 38, "sheet," should read --sheet--.

Col. 9, line 11, "film like" should read --film-like--; and
line 62, "the," should read --the--.

Col. 10, line 40, after "37" insert a period --.--.

Signed and Sealed this

Nineteenth Day of October, 1999

Q. TODD DICKINSON

*Attest:*

*Attesting Officer*          *Acting Commissioner of Patents and Trademarks*